US006230413B1

(12) United States Patent
Reiley

(10) Patent No.: US 6,230,413 B1
(45) Date of Patent: May 15, 2001

(54) TOOL FOR MAKING MITER CUT LOCATIONS ON A DOOR

(76) Inventor: R. Patrick Reiley, 3997 Road 6.5 NE., Moses Lake, WA (US) 98837

( * ) Notice: Subject to any disclaimer, the term of this patent is extended or adjusted under 35 U.S.C. 154(b) by 0 days.

(21) Appl. No.: 09/249,002

(22) Filed: Feb. 12, 1999

(51) Int. Cl.[7] ...................................................... G01B 3/30
(52) U.S. Cl. ............................................... 33/194; 33/41.1
(58) Field of Search ............................. 33/194, 197, 526, 33/527, 562, 567, 41.1

(56) References Cited

U.S. PATENT DOCUMENTS 4,570,350 * 2/1986 Cullison ................................ 33/562
5,274,902 * 1/1994 Rowley ................................. 33/194
5,604,988 * 2/1997 Costelloe ............................... 33/194

FOREIGN PATENT DOCUMENTS

996346 * 9/1976 (CA) ...................................... 33/194

* cited by examiner

*Primary Examiner*—G. Bradley Bennett
*Assistant Examiner*—Gail Verbitsky
(74) *Attorney, Agent, or Firm*—Miller Nash LLP

(57) ABSTRACT

The invention is a tool for marking the diagonal miter cut locations on the horizontal and vertical molding strips of a door or window and for spacing the strips from the edge of the jamb. The tool has parallel, spaced-apart, first and second surfaces, with means attached to the second surface for marking the miter cut locations. The tool also has parallel, spaced-apart, third and fourth surfaces, with the spacing between the third and fourth surfaces corresponding to the distance between the molding strip and the edge of the jamb. Preferably, the means are a pair of blades. In operation, the tool is positioned adjacent a jamb and a strip of door molding, and a swiping movement of the tool scores the strip to mark the miter cut location. The tool enables the precise marking and spacing of moldings relative to jambs or other pieces of molding where precise marking and spacing is required.

7 Claims, 4 Drawing Sheets

TOOL FOR MAKING MITER CUT LOCATIONS ON A DOOR

TECHNICAL FIELD

This invention relates to carpentry tools, and more particularly, the invention relates to a tool for marking the location of diagonal miter cuts on a door or window frame's molding strips and for spacing the molding strips precisely along the edge of the door or window jamb (hereafter called "jamb").

BACKGROUND INFORMATION

Most standard door and window frames have molding strips attached along the outer perimeter of the frame, such as that shown in FIG. 8. The molding is made of strips 40,42 of thin wood, which are nailed over the jambs 36,38. For aesthetic purposes, a diagonal miter cut 44 is made where the strips 40,42 intersect at the corners of the doorframe.

When cutting and installing a door frame's molding strips, the conventional method for marking the location of the miter cut 44 is to simply position an uncut strip over the jamb, and then mark the miter cut with a pencil and straight edge. However, this method is cumbersome and inaccurate because the miter cut locations are usually being pencil-marked by visual approximation (i.e. by "eye-balling") and pencil marks are wide or fuzzy. If the miter cut locations are not marked precisely, the result is poor craftsmanship: Gaps between the cut edges of the horizontal and vertical door molding strips, or uneven spacing between the door molding strips and the edge of the jamb.

The present invention is a marking tool that solves the above problems by marking the miter cut locations on the molding strips so that the strips are precisely cut and positioned with respect to each other and with the jambs. The result is dramatically improved craftsmanship.

SUMMARY OF THE INVENTION

The invention is a tool for marking diagonal miter cut locations on door and window frame molding strips and for spacing the strips a distance from the edge of the jambs. The tool comprises a base having parallel, spaced-apart first and second surfaces, the spacing between the first and second surfaces corresponding to the set-back distance between the molding strips and the edge of the jamb, and a means attached to the second surface for marking the miter cut locations on the molding strips. The base of the tool further comprises parallel, spaced-apart third and fourth surfaces, the spacing between the third and fourth surfaces also corresponding to the distance between the molding strips and the edge of the jamb. Preferably, the means are a pair of blades, and the base is made of a plastic material.

In operation, the first surface is positionable against the edge of the jamb such that the means can contact a molding strip perpendicularly positioned on the jamb relative to the tool. By rotating the tool outwardly—pivoting on corner away from molding—a swiping action causes the blade to score the molding strip, marking the location where the miter cut is to start. To space the molding strip from the edge of the jamb, the third surface is positioned against the edge of the jamb, and the molding strip is positioned against the fourth surface.

BRIEF DESCRIPTION OF THE DRAWINGS

In the drawings, like reference numerals refer to like parts throughout the various views, unless indicated otherwise, and wherein.

BEST MODE FOR CARRYING OUT THE INVENTION

Figure 1:
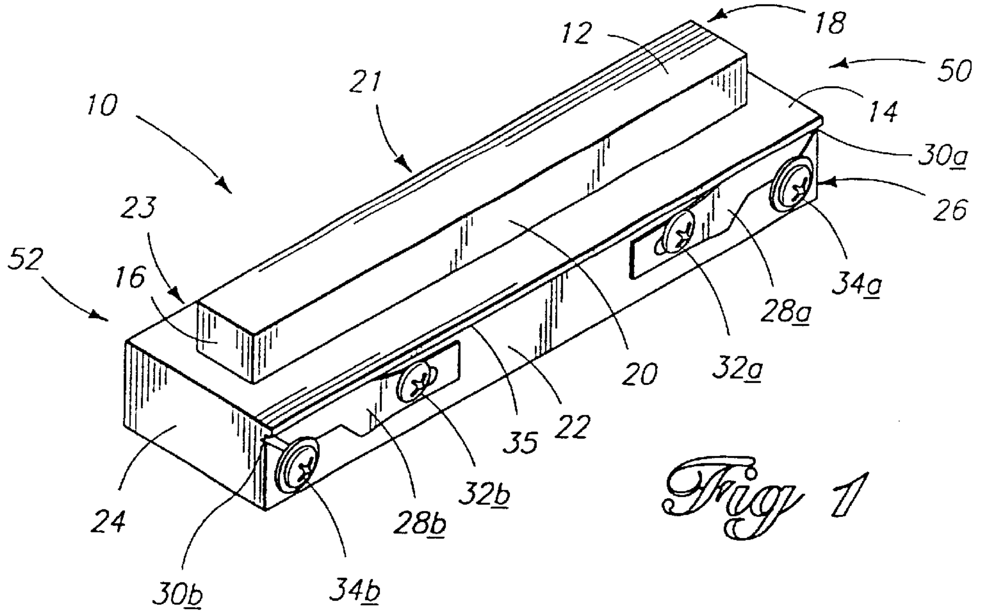
FIG. 1 is an isometric view of an embodiment of the marking tool invention.
Figure 2:
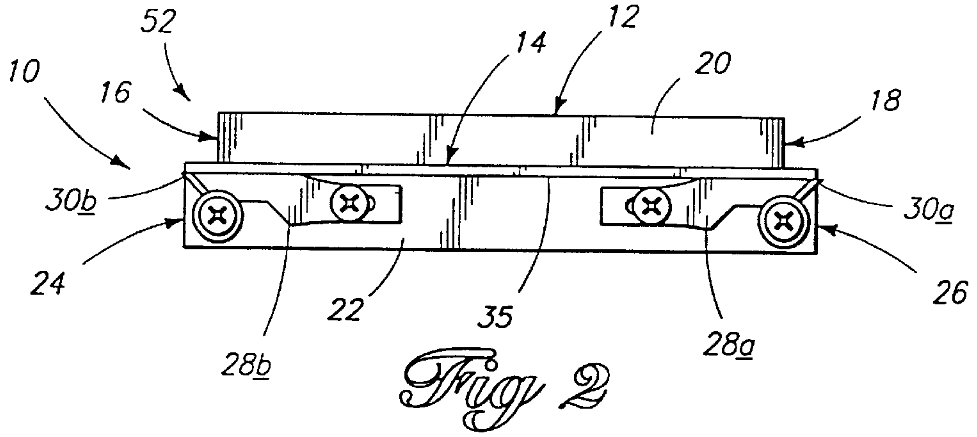
FIG. 2 is a front view of the tool shown in FIG. 1.
Figure 3:
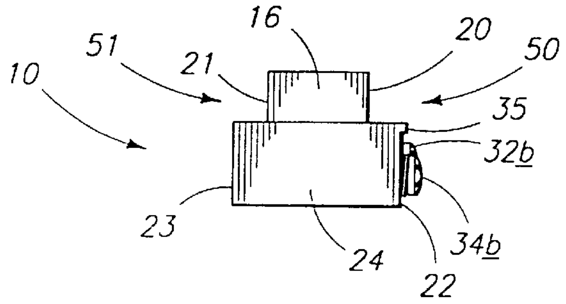
FIG. 3 is an end view of the tool shown in FIGS. 1–2.

Referring now to FIGS. 1–3, shown generally at 10 is the marking tool. In the preferred embodiment, the tool 10 is of a small size such that it can fit in the palm of one's hand. Preferably, the body of the tool 10 is made of durable lightweight plastic, although it can also be made of wood or metal.

The tool 10 has a base having parallel first and second rectangular sections, shown as 12 and 14 respectively. Sections 12 and 14 can be separately manufactured sections that are glued together, machined from solid stock, or they can be made together as a single unit by injection mold, for example. The first section 12 is the smaller of the two sections and has a pair of first surfaces 20, 21, and a pair of third surfaces 16, 18.

The second section 14 also has similar surfaces, specifically, a pair of second surfaces 22, 23, and a pair of fourth surfaces 24, 26. The first section 12 is mounted and centered on top of the second section 14 as shown in FIGS. 1–3, such that there is a perpendicular distance 52 between end parallel third and fourth surfaces 16 and 24, a perpendicular distance 50 between front parallel first and second surfaces 20 and 22, and a perpendicular distance 51 between rear parallel first and second surfaces 21 and 23. The perpendicular distance between end parallel third and fourth surfaces 18 and 26, on the other end of the tool 10, is equivalent to the distance 52. As will be described below, these distances 50, 51, and 52 correspond to the distance between the edges of door molding strips and the edges of a jamb.

A pair of blades **28*a* and 28*b* is mounted on each end of second surface 22. The blades 28*a* and 28*b* are kept in place by screws 32*a*,34*a* and 32*b*,34*b* respectively. The respective cutting edges and points 30*a*,30*b* of each blade extend a short distance past the fourth surfaces 26,24. A small ridge 35 running lengthwise along second surface 22 and adjacent to blades 28*a*,28*b*** additionally helps to hold the blades in place.

Figure 4:
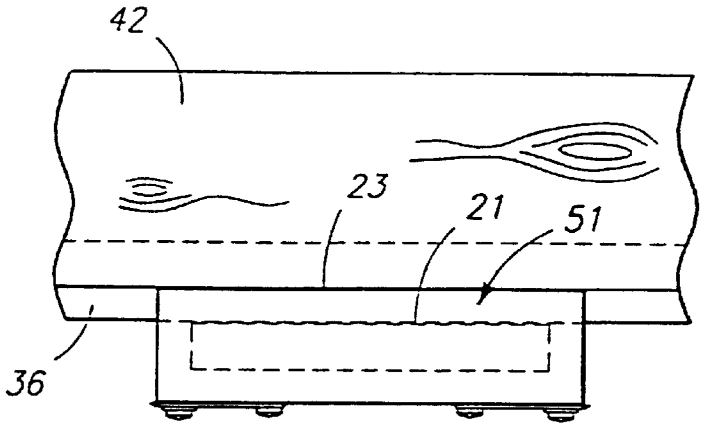
FIG. 4 shows how the tool is positioned to space an uncut horizontal strip of door molding from the edge of a jamb.

How the tool 10 is used is shown in FIGS. 4–7. Referring first to FIG. 4, tool 10 is horizontally positioned against jamb 36, such that first surface 21 of tool 10 abuts against the edge of jamb 36. Horizontal molding strip 42 is positioned over tool 10 so that second surface 23 of tool 10 rests against the edge of the molding strip 42. In this fashion, distance 51 corresponds to the precise spacing and positioning of strip 42 along the jamb 36.

Figure 5:
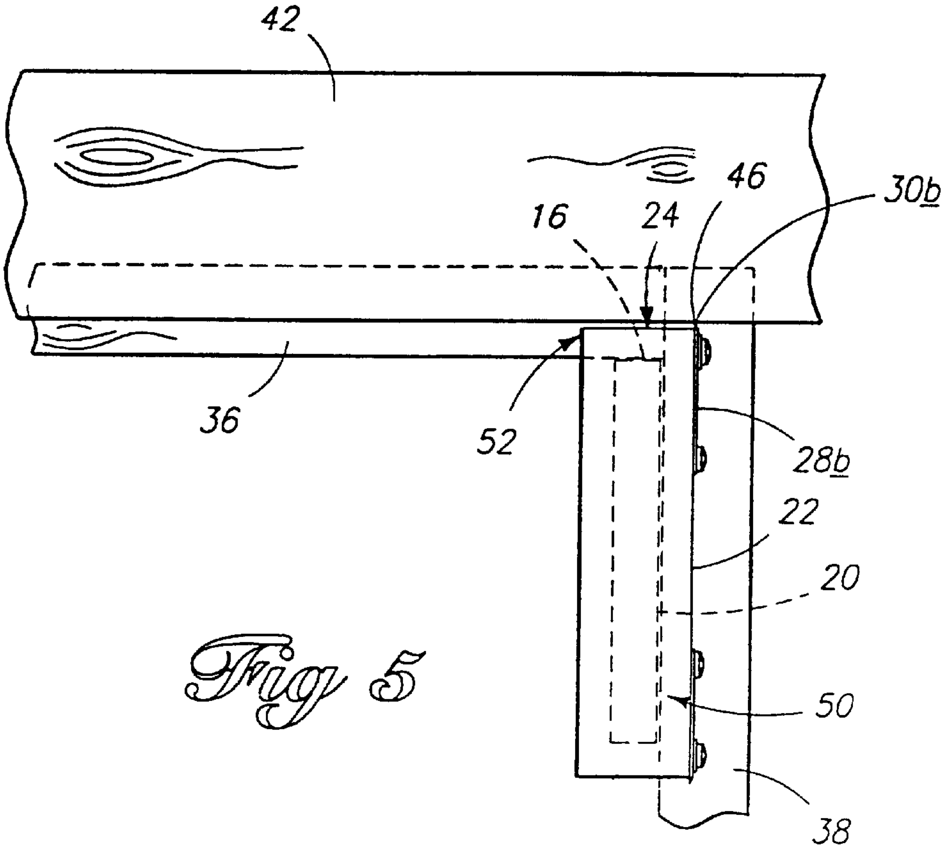
FIG. 5 shows how the tool is positioned to mark the miter cut on the horizontal strip of door molding.

The method for marking the miter cut for horizontal strip 42 is shown in FIG. 5. The uncut horizontal molding strip 42 is temporarily positioned over the jamb, as described in the previous paragraph. Tool 10 is positioned as shown, perpendicular to strip 42, with first surface 20 and third surface 16 of the first section 12 of the tool 10 being fitted snugly against the jambs 36,38, such that the distances 50 and 52 correspond to the distance between the edges of the jamb and strip 42. The blade 28*b* is oriented as shown. Point 30*b* contacts the strip 42 at 46, where the miter cut initially needs to be made. A simple motion of rotating tool 10 outwardly creates a swiping motion that will cause the blade 28*b* to score strip 42 at 46, thus marking the initial miter cut location. Ridge 35 prevents blade 28*b* from sliding off tool 10 as the swiping action is made. Thereafter, the strip 42 is removed from the doorframe and a diagonal miter cut can be made with a saw, starting at the mark scored at 46.

Figure 6:
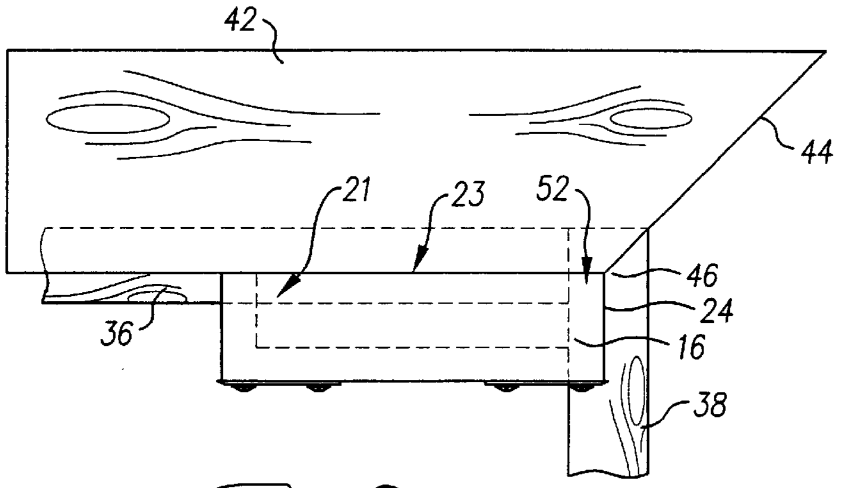
FIG. 6 shows how the tool is positioned to align the mitered cut.

After the cut is made, the horizontal strip 42 is positioned as shown in FIG. 6. Point 46 of miter cut 44 is aligned against the corner of tool 10. By aligning the corner of tool 10 with point 46, the exact spacing between molding strip 42 and the edge of jambs 36,38 (known as the "reveal") is accomplished along two axes.

Figure 7:
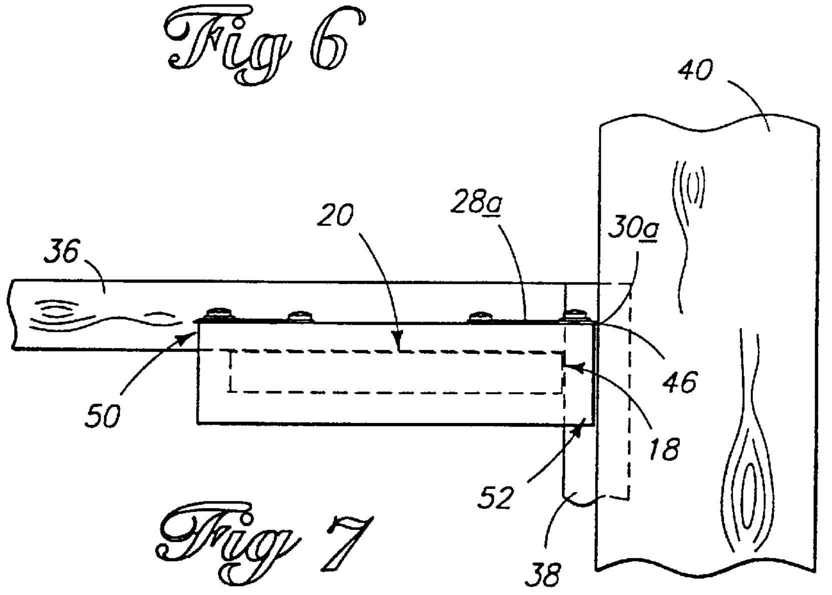
FIG. 7 is a view like FIG. 5 but shows how the tool is positioned to mark the miter cut on a vertical strip of door molding.
Figure 8:
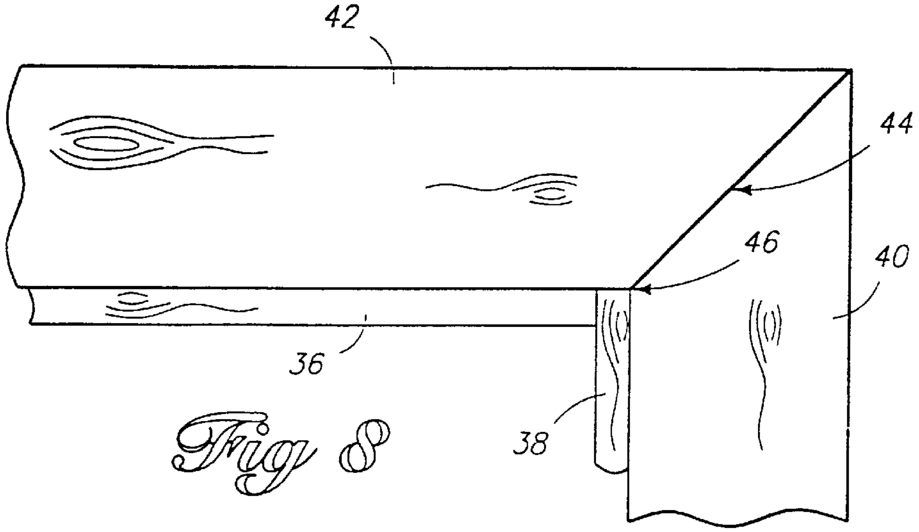
FIG. 8 shows how the horizontal and vertical molding strips are positioned after the miter cuts are completed.
Figure 9:
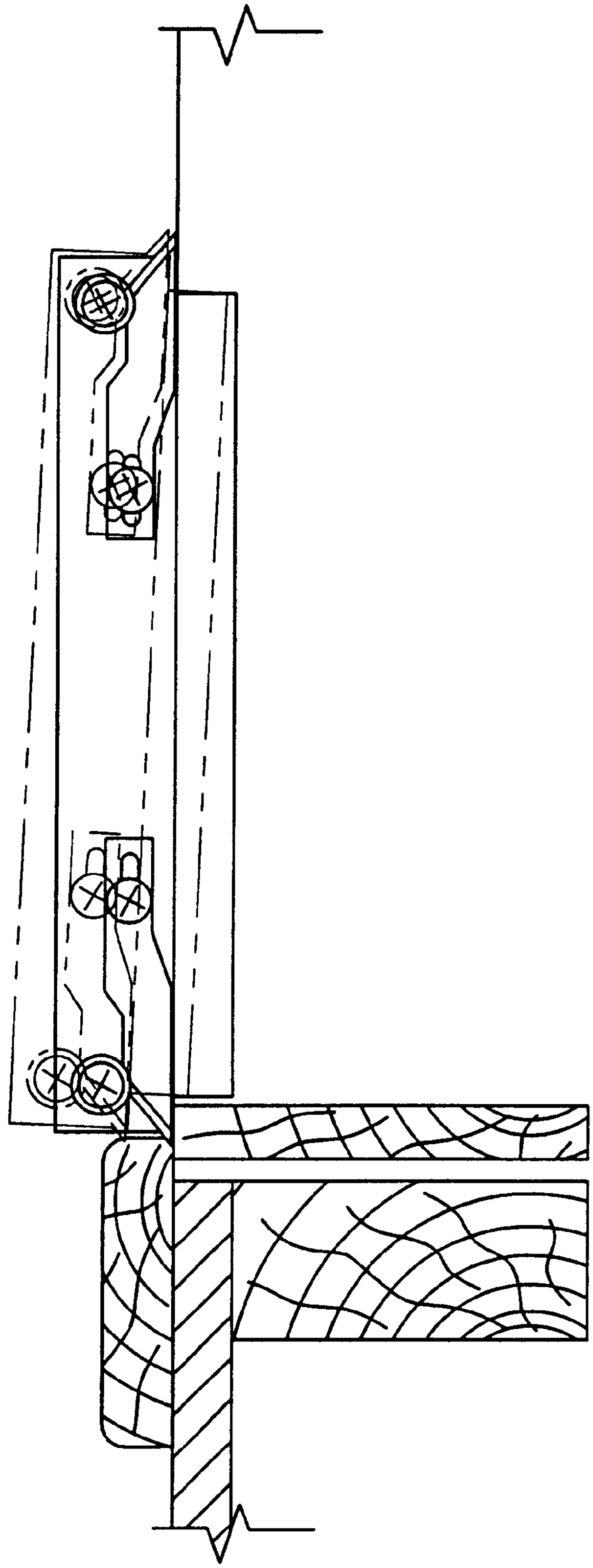
FIG. 9 is a top view of the tool and shows, in dashed lines, how the tool is used to score a miter cut.

The initial positioning of a vertical molding strip 40 is not shown in the figures, but the method of doing so is the similar as that shown in FIG. 4 and described above for horizontal strip 42. The marking of a vertical door molding strip 40 is shown in FIG. 7. Tool 10 is oriented horizontally and perpendicularly to strip 40, as shown in the figure, with blade 28*a* (and point 30*a*) marking the miter cut location for strip 40 at 46. The procedure for scoring and cutting strip 40 is the same as described previously for the horizontal strip 42. The procedures are repeated to position, score, and cut the other corners of the door or window frame. FIG. 9 illustrates, in dashed lines, the swiping motion used to score a window or door frame.

A completed miter cut is shown in FIG. 6. By using tool 10, both strips of door molding 40,42 will always have a clean miter cut 44 because the tool 10 precisely marks the initial miter cut location 46 on both door strips. Also, the edges of the strips 40,42 will be uniformly spaced from the edges of the jambs 36,38.

The discussion above describes what the inventor believes is the best embodiment of the invention. It is to be appreciated that there may be many ways of modifying the invention without departing from the spirit and scope of the invention as described above. For example, the blades can be replaced with suitably mounted, small-sized pencils or pens to mark the miter cuts. Consequently, the preceding description is not intended to limit the scope of what is considered to be the invention. Instead, the scope of the invention is limited solely by the claim or claims that follow, the interpretation of which is to be made in accordance with the established doctrines of patent claim interpretation.

What is claimed is:

1. A tool for marking diagonal miter cut locations on molding strips of a jamb, such as a window jamb, doorjamb, and the like and for spacing the molding strips a distance from the edge of the jamb, the molding strips being mountable over the jamb, comprising:

a base having parallel, spaced-apart first and second surfaces, the spacing between the first and second surfaces corresponding to the distance between the molding strips and the edge of the jamb;

the base further including parallel, spaced-apart third and fourth surfaces, the spacing between the third and fourth surfaces corresponding to the distance between the molding strips and the edge of the jamb, wherein the parallel, spaced-apart first and second surfaces are orthogonal to the parallel, spaced-apart third and fourth surfaces; and means attached to the second surface for marking the miter cut location on the molding strips, and in operation, the first surface is positionable against the edge of the jamb such that the means can contact and mark a molding strip perpendicularly mounted on the jamb relative to the tool.

2. The tool of claim 1, wherein the means comprises a pair of blades fixedly attached to the second surface.

3. The tool of claim 1, wherein the blades extend past the edge of the second surface.

4. The tool of claim 1, wherein the base is made of a plastic material.

5. The tool of claim 1, wherein the based is made of wood.

6. The tool of claim 1, wherein the base is made of metal.

7. A tool for marking diagonal miter cut locations on the molding strips of a jamb and for spacing the molding strips a distance from the edge of the jamb, the molding strips being mountable over the jamb, comprising:

a base having parallel, spaced-apart, first and second rectangular, planar surfaces, wherein the second surface has two end regions and the spacing between the first and second surfaces corresponds to the distance between the edge of the jamb and the molding strips;

the base further including parallel, spaced-apart third and fourth rectangular, planar surfaces, the spacing between the third and fourth surfaces corresponding to the distance between the molding strips and the edge of the jamb; and a pair of blades mounted to the end regions of the second surface and having cutting edges that extend past the end regions, such that when the first surface is positioned against the edge of the jamb, the cutting edge can mark a molding strip perpendicularly mounted on the jamb relative to the tool.

* * * * *